United States Patent

Yamaguchi et al.

[11] Patent Number: 5,986,845
[45] Date of Patent: Nov. 16, 1999

[54] APPARATUS FOR POSITIONING MAGNETIC HEAD AND METHOD OF THE SAME

[75] Inventors: Takashi Yamaguchi, Tsuchiura; Katsuhiro Tsuneta, Odawara; Katsumoto Onoyama, Hiratsuka; Tsuyoshi Arai, Odawara; Yoshikatsu Fujii, Atsugi; Hidehiko Numasato; Yosuke Hamada, both of Odawara; Masahito Kobayashi, Ibaraki-ken, all of Japan

[73] Assignee: Hitachi, Ltd., Tokyo, Japan

[21] Appl. No.: 08/823,837

[22] Filed: Mar. 25, 1997

[30] Foreign Application Priority Data

Mar. 28, 1996 [JP] Japan ................................. 8-073689

[51] Int. Cl.⁶ .................................................. G11B 21/02
[52] U.S. Cl. ............................ 360/75; 360/60; 360/78.04
[58] Field of Search ........................... 360/75, 60, 78.01, 360/78.04, 78.06, 78.07, 78.08, 78.09

[56] References Cited

U.S. PATENT DOCUMENTS

| | | | |
|---|---|---|---|
| 4,956,831 | 9/1990 | Sarraf et al. | 369/32 |
| 5,257,255 | 10/1993 | Morimoto et al. | |
| 5,426,545 | 6/1995 | Sidman et al. | |
| 5,452,612 | 9/1995 | Smith et al. | 73/514.34 |
| 5,521,772 | 5/1996 | Lee et al. | 360/75 |

FOREIGN PATENT DOCUMENTS

| | | |
|---|---|---|
| 655736A2 | 5/1995 | European Pat. Off. |
| 735522A1 | 10/1996 | European Pat. Off. |
| 3-192585 | 8/1991 | Japan |

Primary Examiner—Aristotelis M. Psitos
Assistant Examiner—Dan I. Davidson
Attorney, Agent, or Firm—Beall Law Offices

[57] ABSTRACT

An apparatus for positioning a magnetic head includes a servo signal detection circuit for detecting a servo signal recorded on a magnetic disk in a predetermined first period, an acceleration measuring portion which is fitted to a part of a mechanism for mounting a magnetic head, outputs an acceleration signal in a direction of positioning the magnetic head, and samples the acceleration signal in a second period shorter than the first period, a comparison processing portion for comparing a deviation value computed from at least either one of the acceleration signal and the servo signal with a predetermined value, a write inhibit signal generating portion for generating a signal inhibiting write of data on a magnetic disk in accordance with the result of comparison in the comparison processing portion, and a manipulated variable compensation portion for generating manipulated variable for adjusting the position of the magnetic head from at least either one of the servo signal and the acceleration signal and a target value of the position of the magnetic head, whereby to prevent erroneous write operation of data onto a magnetic disk due to unsteady positioning error of the magnetic head.

19 Claims, 12 Drawing Sheets

APPARATUS FOR POSITIONING MAGNETIC HEAD AND METHOD OF THE SAME

BACKGROUND OF THE INVENTION

1. Field of the Invention

The present invention relates to a rotating storage device, and more particularly to a technique effective in detecting of an abnormality such as off-track positioning, data protection or the like in an information storage device such as a magnetic disk unit.

2. Description of the Related Art

In JP-A-63-213176, there is disclosed a method in which an accelerometer is installed on a cabinet body or a base, a cover, a circuit substrate or the like of a device, so that a vibration or a shock from the outside of the device is detected thereby to suspend data recording, or so that reaction force against a seek driving force is detected thereby to feed back the reaction force to a control system. Further, in JP-A-60-136972, a technique for performing state feedback control by installing an accelerometer on a head slider is disclosed. In JP-A-63-42073, a technique that an accelerometer is fitted to a carriage portion and state feedback is made in order to remove mechanical resonance of a pivot portion of a rotary carriage is disclosed. Further, in JP-A-2-226560, a technique that a sensor for detecting bending vibration of an arm portion and an actuator are provided so as to improve rigidity of the arm portion in point of control. Furthermore, in JP-A-3-76064 and JP-A-3-192585, an accelerometer is provided in the vicinity of a carriage or a head so as to constitute an analog minor loop in a sector servo system.

SUMMARY OF THE INVENTION

It is an object of the present invention to provide an apparatus for positioning a magnetic head and a method of positioning a magnetic head that prevent an erroneous write operation of data caused by an unsteady positioning error of a magnetic head so as to improve reliability of the read/write of data for a magnetic disk.

A first aspect of an apparatus for positioning a magnetic head and a method of positioning a magnetic head according to the present invention exists in such a structure that a head position is computed from a detected acceleration signal and is compared with a servo signal, and the deviation and a predetermined value are compared with each other thereby to generate a write inhibit signal in accordance with this value.

A second aspect of the present invention exists in such a structure that a position of a head is computed from the detected acceleration signal, and this value and a predetermined value are compared with each other thereby to generate a write inhibit signal in accordance with a value of the result of comparison.

A third aspect of the present invention exists in such a structure that a future position of a head is estimated from an acceleration signal, and a write inhibit signal is generated in accordance with the result of comparison between the future position and a predetermined value.

A fourth aspect of the present invention exists in such a structure that a detection error of a servo signal is detected using an acceleration signal.

A fifth aspect of the present invention exists in such a structure that an acceleration signal and a predetermined value are compared with each other, and a write inhibit signal is generated in accordance with the value obtained as the result of comparison.

A sixth aspect of the present invention exists in such a structure that an output of an accelerometer is used as a feedback signal for position control of a head during a period until a rotating storage medium reaches a certain rotation after the power supply is put ON.

With the above-mentioned structure of the present invention, it is possible to prevent an erroneous write operation of data caused by an unsteady positioning error, thereby to improve the reliability of data.

It is also possible to maintain precise servo control by correcting offset of a head caused by an unsteady positioning error.

It is further possible to estimate an unsteady positioning error and prevent an erroneous write operation of data, thereby to improve the reliability of data.

It is still further possible to surely prevent an obstacle caused by a disturbance or the like during a period when a normal servo control system does not function immediately after starting and so on.

DESCRIPTION OF THE PREFERRED EMBODIMENTS

Embodiments of the present invention will be described in detail with reference to the drawings.

Figure 1:
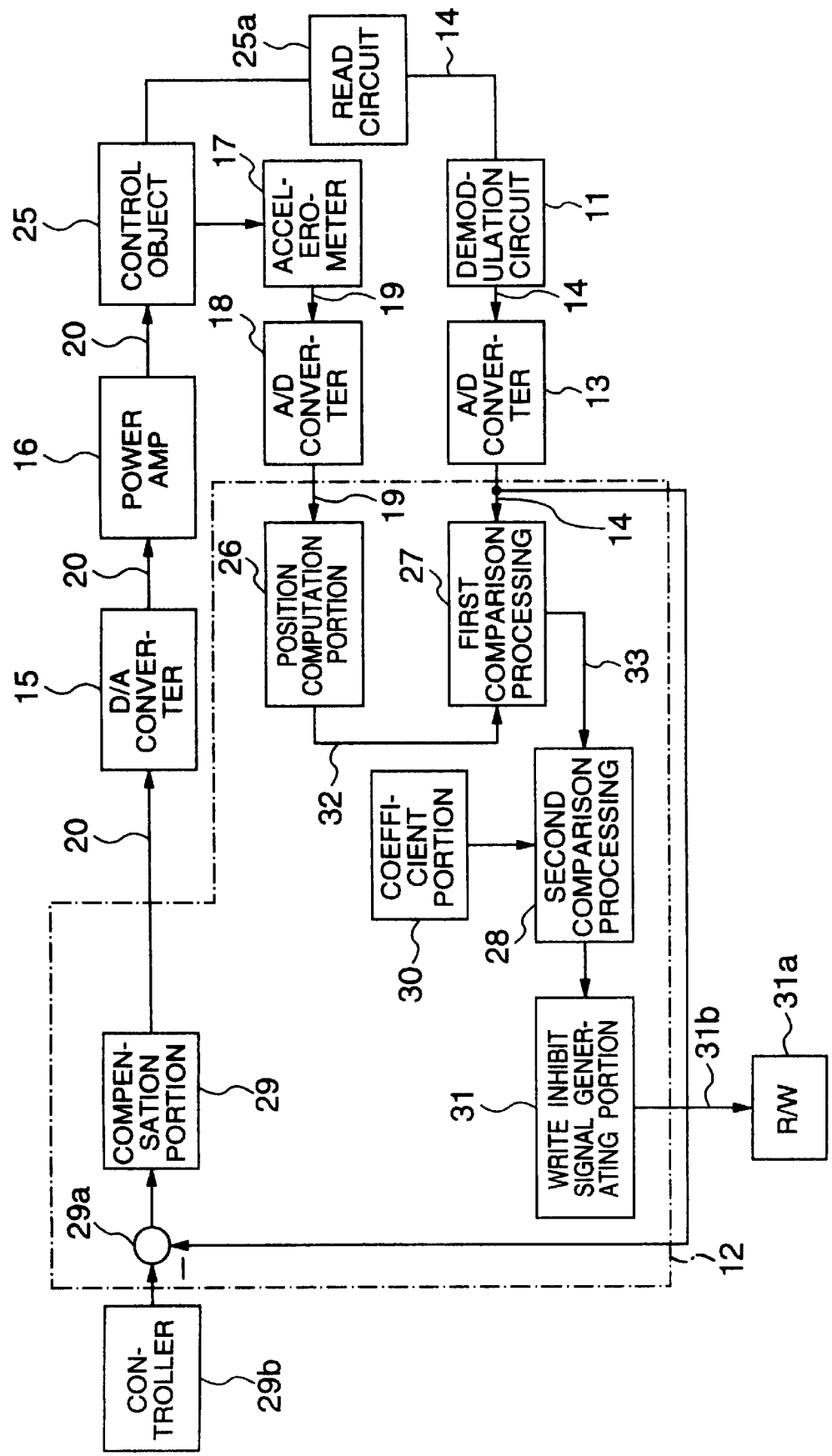
FIG. 1 is a block diagram showing a first embodiment of an apparatus for positioning a magnetic head according to the present invention.
Figure 2:
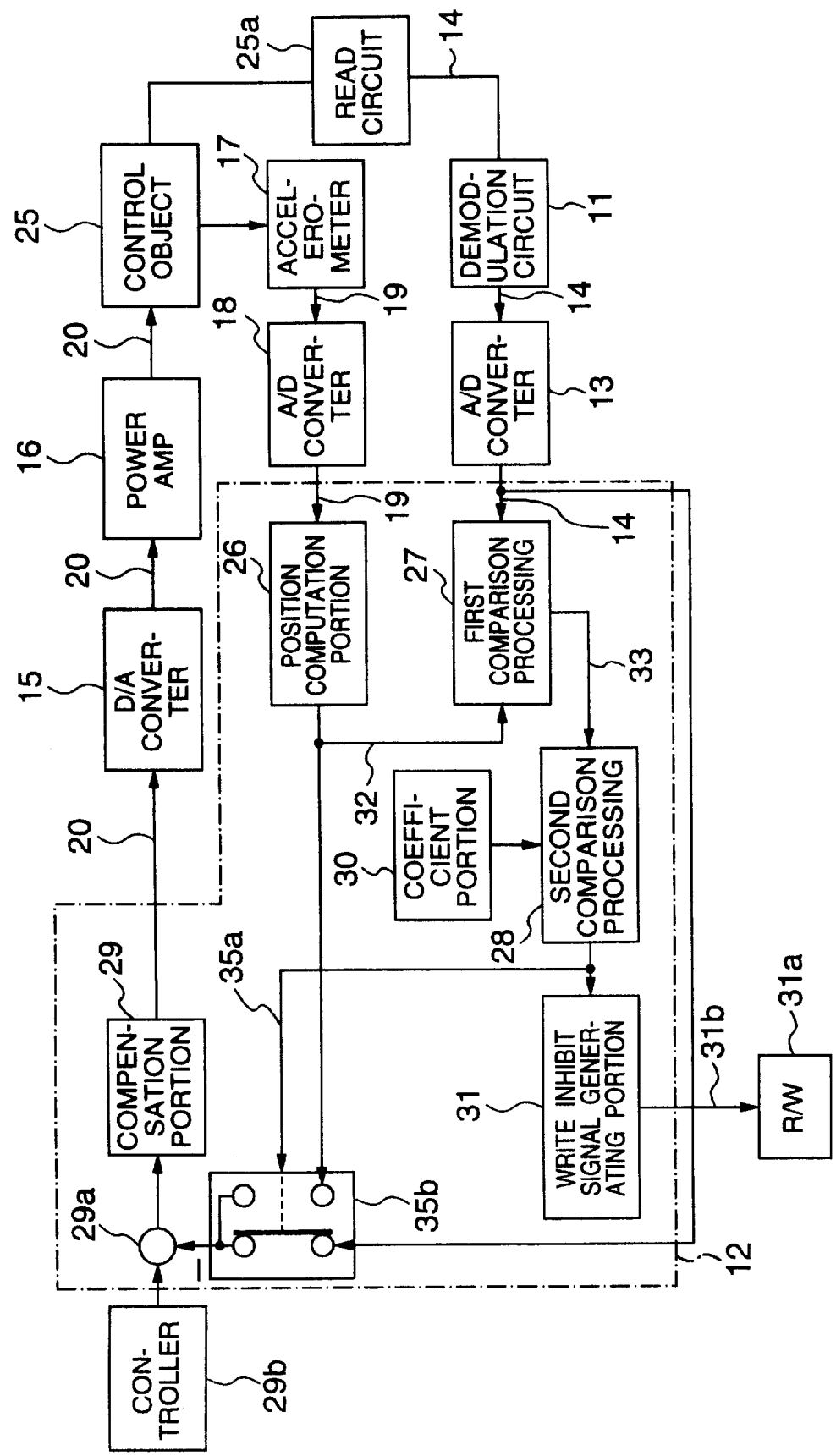
FIG. 2 is a block diagram showing another embodiment of an apparatus for positioning a magnetic head according to the present invention.
Figure 3:
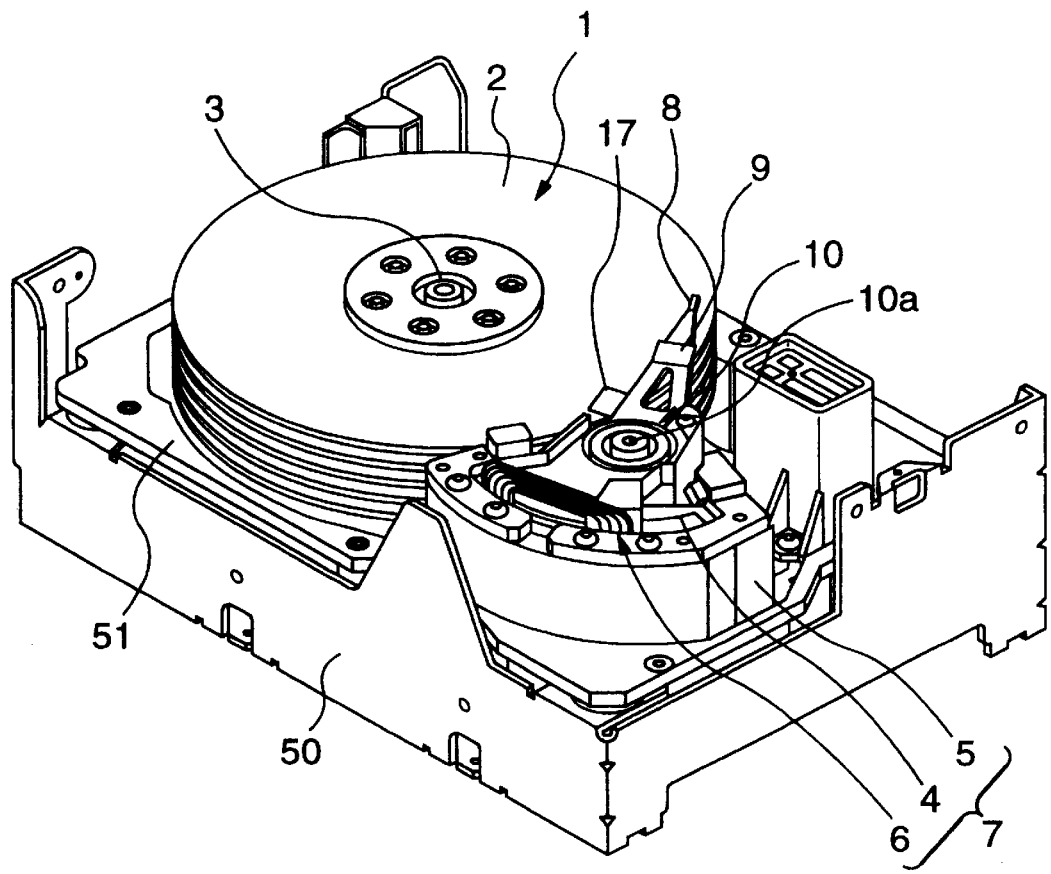
FIG. 3 is a perspective view showing a magnetic disk device using an apparatus for positioning a magnetic head according to the present invention.

FIG. 1 is a block diagram showing a structure of a control system in an apparatus for positioning a magnetic head which is a first embodiment of the present invention, FIG. 2 is a block diagram showing a modification example thereof, and FIG. 3 is a perspective view showing a structure of a magnetic disk unit using an apparatus for positioning a magnetic head. The apparatus for positioning a magnetic head will be described hereinafter.

First, a structure of a magnetic disk unit in the present embodiment will be described with reference to FIG. 3. A plurality of data tracks 2 are written in a concentric circle form on a disk surface thereof. A plurality of magnetic disks are stacked and supported coaxially with a spindle shaft 3, and are rotated by means of a motor not shown.

A magnetic head and a slider 8 (hereinafter referred to simply as a magnetic head 8) for performing recording/playback of information on the magnetic disks 1 are fixed to a point portion of a load arm 9 which applies a load to the magnetic head 8 in a direction perpendicular to the disk surface. A base end portion of the load arm 9 is supported by a carriage 10 rotating around an oscillating shaft 10a installed in parallel with the spindle shaft 3 at a spacing that the load arm 9 catches the magnetic disk 1.

An actuator, formed of a voice coil motor 7 composed of a permanent magnet 4 fixed to the cabinet body side, a yoke 5 and a coil 6 projected from the carriage 10 and fitted to a movable portion, is provided on the carriage 10. The actuator generates a thrust for oscillating the carriage 10 and the load arm 9 around the oscillating shaft 10a by generating an electrical current in the coil 6.

The magnetic head 8, the load arm 9 for applying a load to the disk surface in a perpendicular direction and the carriage 10 supporting the load arm oscillate around the oscillating shaft 10a by the thrust of the actuator. With this, the magnetic head 8 is moved radially on the disk surface, thus performing a seek operation so as to be positioned at an objective data track 2 on the disk surface.

These mechanism parts are assembled in the cabinet body 50, and a circuit substrate not shown is fitted onto the back of a base 51 of the cabinet body 50. Signal transmission from the magnetic head 8 and supply of an electric current to the actuator are performed through the circuit substrate and a flexible flat cable.

A servo signal is written in advance in the data tracks 2 on the disk surface at specified intervals, and the magnetic head 8 detects a servo signal with a sampling frequency determined by the product of the number of rotations of the magnetic disk 1 and the number of servo signals per rotation. The servo signal consists of a gray code expressing track number information, a burst signal expressing positional information in the data track 2 and so on, and is converted into an output voltage in proportion to position in a demodulation circuit after being amplified in an amplifier, and inputted to a microprocessor through an AD converter. The structure of this servo signal is well-known, and is disclosed in, for example, "Initial Value Compensation Design of Mode Change-over Type Control and Application to Magnetic Disk Unit" by Yamaguchi, Shishida, Toyama and Hirai, Transactions of the Society of Instrument and Control Engineers, Vol. 31, No. 6, pp. 780/788 (1995).

Figure 4:
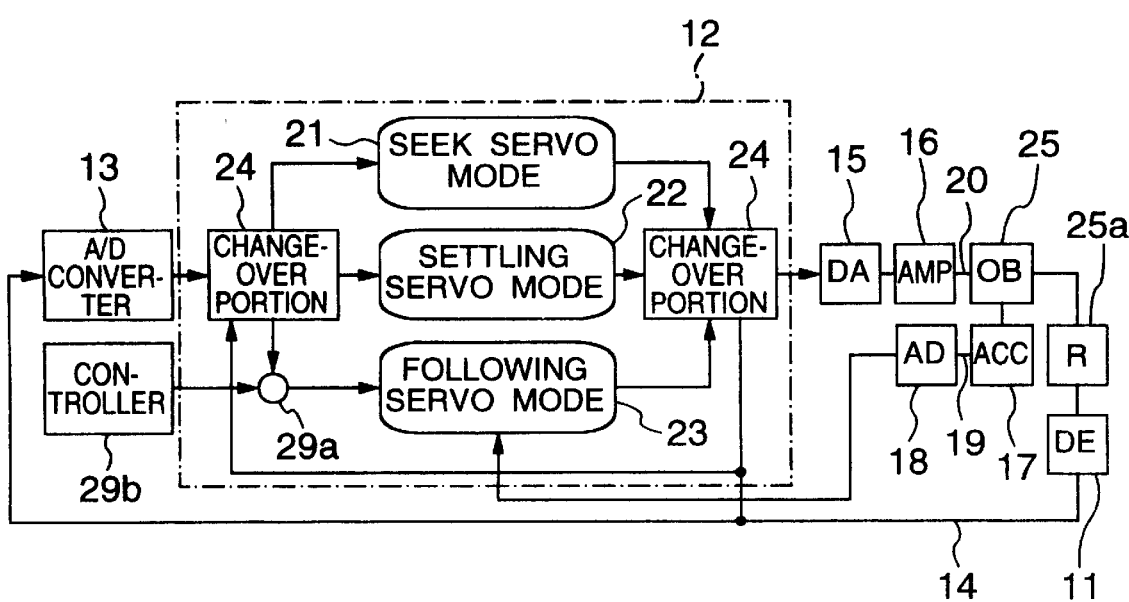
FIG. 4 is a block diagram showing a whole circuit structure using an apparatus for positioning a magnetic head according to the present invention.

As illustrated in a block diagram of a circuit system shown in FIG. 4, in a magnetic disk unit of the present embodiment, a microprocessor 12 computes a manipulated variable in accordance with a deviation from a target position by a servo signal 14 (obtained, for example, by demodulating a servo signal read by a servo signal read circuit 25a in a demodulation circuit 11 and inputting the demodulated servo signal through an AD converter 13 and applying AD conversion), and in accordance with a control algorithm of a known seek servo mode for moving the magnetic head 8, a settling servo mode for positioning the magnetic head 8 on a predetermined track and a following servo mode for making the magnetic head 8 follow a positioned track. The microprocessor 12 supplies manipulated variable data 20 to a power amplifier 16 through a DA converter 15. The manipulated variable data 20 are current-amplified by the power amplifier 16, and an electric current is supplied to the actuator through a cable. The structure of the servo mode is disclosed in, for example, "Design of Initial Value Compensation for Mode Switching Controller and Its Application to Magnetic Disk Drives" by Yamaguchi, Shishida, Toyama and Hirai, Transactions of the Society of Instrument and Control Engineers, Vol. 31, No. 6, pp. 780/788 (1995).

In the case of the present embodiment, an accelerometer 17 for detecting acceleration in a direction of positioning the magnetic head 8 is fitted on the magnetic head 8 side of the oscillating shaft 10a of the carriage 10. An acceleration signal 19 of the accelerometer 17 is transmitted to the substrate similarly through a flexible flat cable, and inputted to the microprocessor 12 through an AD converter 18. The accelerometer 17 may be fitted to a part of the magnetic head 8 or the load arm 9 without being limited to a part of the carriage 10 illustrated in FIG. 3.

As described above, the input signals to the microprocessor 12 are the servo signal 14 expressing a relative displacement between the magnetic head 8 and the magnetic disk 1, and the acceleration signal 19 measured by the accelerometer 17. Then, the microprocessor 12 outputs manipulated variable data 20 to the actuator. The detection time interval of the servo signal 14 is determined univocally by the rotational frequency of the magnetic disk 1 and the number of the servo signals 14. For example, when it is assumed that there are 74 Servo Signals per one rotation of the data track 2 at 5,400 rpm, the sampling frequency is 6.7 KHz and the sampling period of the servo signal 14 is 150 µs. The servo signal 14 is inputted to the microprocessor 12 in this period.

On the other hand, the acceleration signal 19 from the accelerometer 17 can be introduced into the microprocessor 12 through the AD converter 18 at a sampling frequency of 50 µs, for instance. The input timing of the servo signal 14 is in accord with that of the acceleration signal 19 from the accelerometer 17. Accordingly, the servo signal 14 and the acceleration signal 19 are inputted to the microprocessor 12 every 150 µs and every 50 µs, respectively. Further, the sampling period of the output from the microprocessor 12, i.e., the manipulated variable data 20 from the DA converter 15, is 50 µs. With the foregoing, it is noted that the servo control system of the present embodiment is a digital control system having a sampling period of 50 µs.

Figure 5:
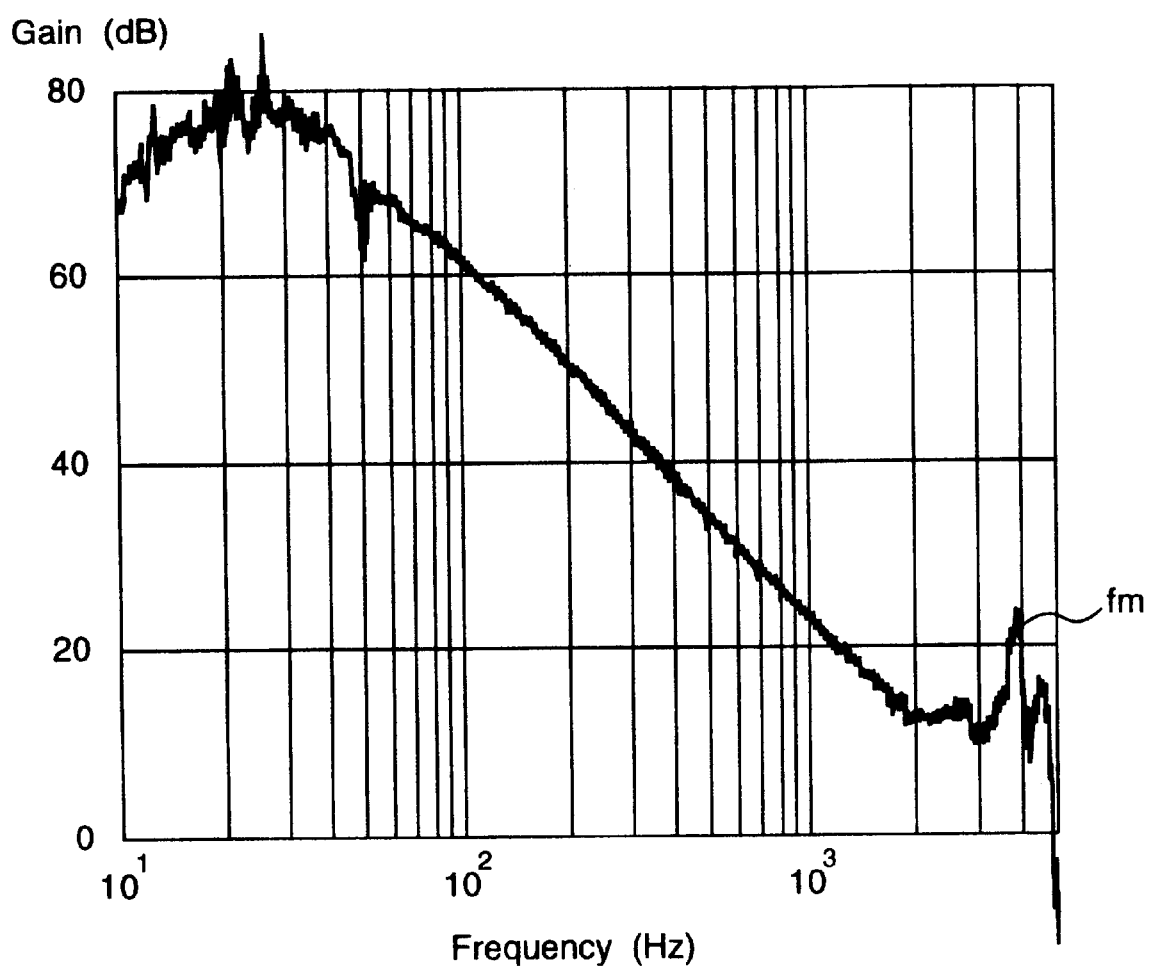
FIG. 5 is a graph showing an example of frequency characteristics of a predetermined part in a magnetic disk unit.

A positioning control system of the magnetic head 8 of the magnetic disk unit is composed of a seek servo mode 21 for moving the magnetic head 8 to a target track at a high speed, a settling servo mode 22 for positioning the magnetic head 8 smoothly with a target track as the center, and a following servo mode 23 for positioning the magnetic head 8 with a target track as the center and making the magnetic head 8 follow that track in order to perform recording/playback. These modes are changed over by means of a change-over portion 24 sequentially depending on a deviation between the target track and the position of the magnetic head 8. Here, a control object 25 is the voice coil motor 7, the carriage 10, the load arm 9 or the magnetic head 8, i.e., that which moves physically. An example of frequency characteristics of the control object 25 is shown with a Bode diagram in FIG. 5. Here, a resonance frequency fm is originated in the rigidity of the part of the oscillating shaft 10a of the carriage 10, and it shows that resonance has been generated by the natural frequency thereof and disturbance. On the other hand, a resonance mode higher than the resonance frequency fm is the resonance at an assembly portion ahead of the load arm 9. Another structure shown in FIG. 4 will be described in detail by assigning the same reference numerals in FIG. 1.

Next, the structure and the operation of a control system in the first embodiment of the present invention will be described in detail with reference to FIG. 1. FIG. 1 shows a block diagram of the following servo mode 23 shown in FIG. 4, and the change-over portion 24 and the other modes shown in FIG. 4 are omitted. For example, the acceleration signal 19 is inputted to the microprocessor 12 from the AD converter 18 at a sampling period every 50 μs from the accelerometer 17 fitted to the magnetic head 8. The microprocessor 12 includes, a position computing portion 26 for obtaining positional information 32 of the magnetic head 8 on the magnetic disk 1 by integrating the acceleration signal 19 twice, a first comparison processing portion 27 for comparing this positional information 32 with the servo signal 14 taken in from the AD converter 13, a second comparison processing portion 28 for comparing a deviation 33 between the positional information 32 obtained from the first comparison processing portion 27 and the servo signal 14 with a coefficient portion 30 of a predetermined value, and a write inhibit signal generating portion 31 for generating a write inhibit signal in accordance with the result of comparison by the second comparison processing portion 28. The write inhibit signal generating portion 31 outputs a write inhibit signal 31b to a read/write circuit for read/write data to the magnetic disk 1 through the magnetic head 8 via a port not shown for the purpose of making the acceleration signal 19 to have the same dimension as the positional information 32 to integrate the acceleration signal 19 twice.

Then, the servo signal 14 is compared with the positional information 32 obtained from the servo signal 14 and the acceleration signal 19 in every sampling period of 150 μs in a first comparison processing portion 27 so as to obtain a deviation 33, and, when the deviation 33 reaches or exceeds a predetermined value specified in a coefficient portion 30, the write inhibit signal generating portion 31 generates a write inhibit signal 31b thereby to inhibit writing of data. The deviation 33 is compared with a predetermined value outputted from the coefficient portion 30 in the second comparison processing portion 28. If the deviation 33 is larger than 0.5 μm, for example, it would be assumed that the control object is unusual. With this, for example, when the servo signal 14 is detected erroneously by characteristic variation of a reproducing head of a recording/playback separable head in the magnetic head 8 and an offset of the magnetic head 8 is produced, the data recording operation is prohibited, thereby to protect the data recorded in the magnetic disk 1. Reference numeral 29a represents an adder which obtains the difference between a target value from a controller 29b of the magnetic disk unit, and a compensation portion 29 obtains manipulated variable data 20 so that this difference becomes zero.

FIG. 2 shows another example of an apparatus for positioning a magnetic head. In this example, a deviation 33 between the servo signal 14 and the acceleration signal 19 is compared with the coefficient portion 30 in the second comparison processing portion 28, and when the deviation 33 reaches a predetermined value or higher, the magnetic head 8 is protected from offset with erroneous detection of the servo signal 14 using positional information 32 obtained from the acceleration signal 19 for feedback.

Namely, in the structure shown in FIG. 2, the second comparison processing portion 28 outputs change-over control data 35a when the deviation 33 reaches a predetermined value or higher, and there is provided a selective processing portion 35b which operates so as to select either one of the servo signal 14 outputted by the AD converter 13 or the acceleration signal 19 outputted by the AD converter 18 with the data 35a. In a normal state, the selective processing portion 35b is set so as to select the servo signal 14, and, when the deviation 33 between the servo signal 14 and the acceleration signal 19 reaches a predetermined value or higher in the second comparison processing portion 28, i.e., when an abnormality is detected in the servo signal 14, the selective processing portion 35b is changed over so as to select the positional information 32 from the AD converter 18 and uses the positional information 32 obtained from the acceleration signal 19 for feedback to the adder 29a. Since the other structures have already been described with reference to FIG. 1, the description thereof is omitted.

Since an accelerometer 17 is installed on the magnetic head 8 or on the carriage 10, the load arm 9 or the like supporting the magnetic head 8, such that it is possible to detect the acceleration quantity applied to the positioning control system of the magnetic head 8 as described above, it is possible, in the following servo mode 23, to surely detect an abnormality such as an offset caused by unsteady disturbance generated at a timing which cannot be detected in the sampling period of the normal servo signal 14, and to protect data by write inhibit. Furthermore, in the case of an abnormality of the servo signal 14, it is possible to precisely correct generation of offset of the magnetic head 8 from a predetermined track caused by erroneous detection of the servo signal 14 by using the positional information 32 obtainable from the acceleration signal 19 as a feedback signal for position control of the magnetic head 8. As a result, it is possible to provide a highly reliable magnetic disk unit. Besides, as shown in FIG. 2, the changeover control data 35a outputted from the second comparison processing portion 28 are also given to the write inhibit signal generating portion 31, thus executing write inhibit by the write inhibit signal 31b. On the other hand, however, the positional information 32 is supplied to the adder 29a, and new manipulated variable data 20 are generated through the compensation portion 29. Although the above statements seem to be contrary to each other, logically, the manipulated variable data 20 are generated in accordance with the positional information 32, and thus the position of the magnetic head 8 is corrected.

In other words, it becomes possible to achieve an increase in the information recording capacity of the magnetic disk 1 by narrowing the spacing among the data tracks 2.

Further, the structure of the position computing portion 26, the first comparison processing portion 27, the second comparison processing portion 28, the write inhibit signal generating portion 31, the selective processing portion 35b and the like has been realized by a control program in the microprocessor 12, but it may also be realized with hardware of an exclusive circuit. In the case of a hardware structure, it is possible to realize it easily by arranging the circuits of processing portions and/or signal generating portions shown in FIG. 1 and FIG. 2 on a wiring substrate. Since the functions of these circuits are overlapped with those that have been described already, the description thereof is omitted.

Figure 6:
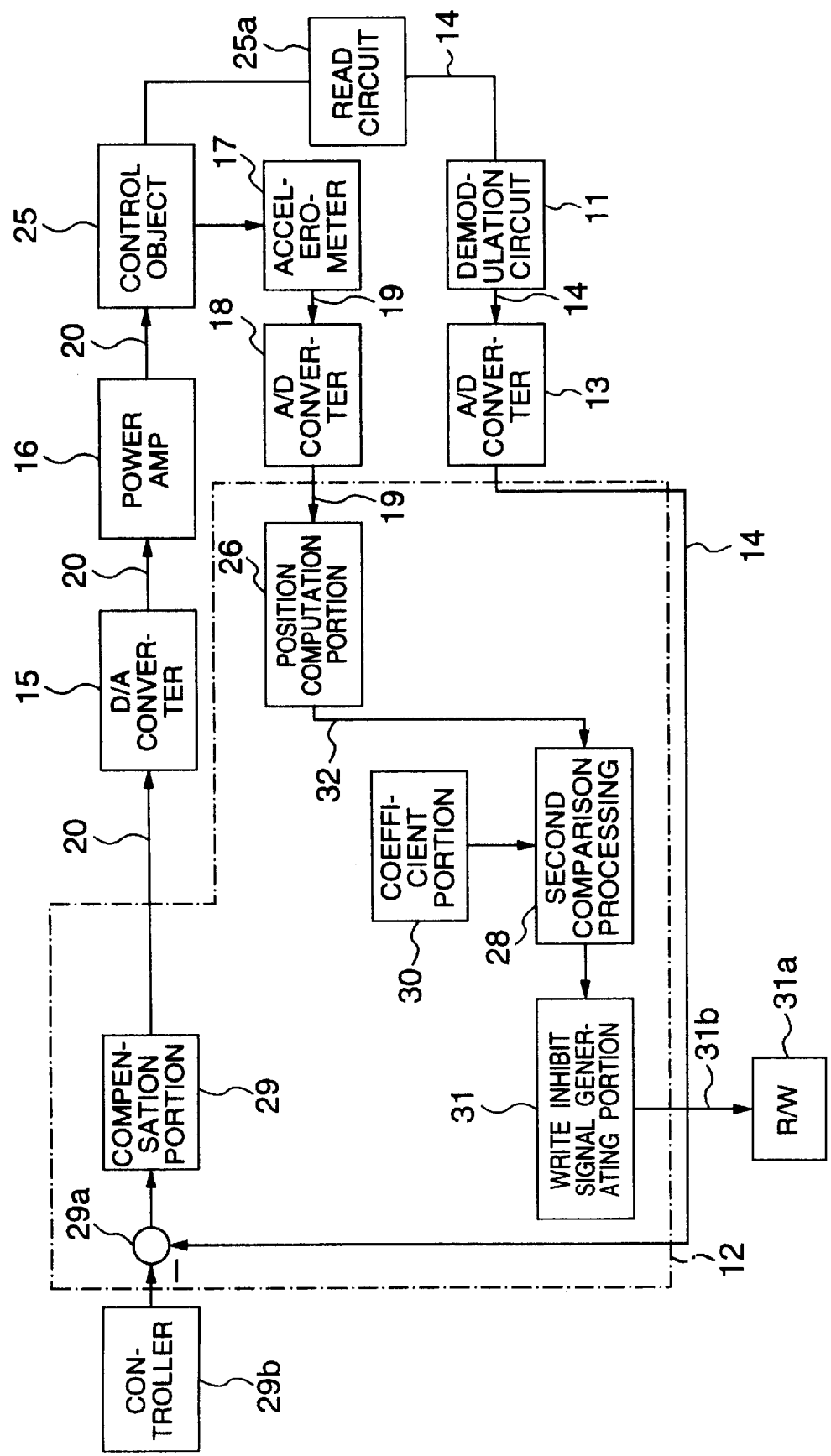
FIG. 6 is a block diagram showing another example of an apparatus for positioning a magnetic head according to the present invention.

FIG. 6 is a block diagram showing another example of an apparatus for positioning a magnetic head of the present invention. The control system shown in FIG. 6 includes a position computing portion 26 for obtaining positional information 32 by twice integrating an acceleration signal 19 outputted from an accelerometer 17, a second comparison processing portion 28 for comparing the positional information 32 with a coefficient portion 30 having a predetermined value, and a write inhibit signal generating portion 31 for generating a write inhibit signal 31b in accordance with the result of comparison. What differs from the example shown in FIG. 1 is that the first comparison processing portion 27 is not provided.

In the case of this example, in the following servo mode 23, when the positional information 32 obtained from the acceleration signal 19 in every detection sampling period of 50 μs of the acceleration signal 19 reaches or exceeds a value specified in the coefficient portion 30, the write inhibit signal 31b is generated so as to inhibit recording on the magnetic disk 1 when the servo signal 14 is detected erroneously by defects in the servo signal 14 or the like and an offset is generated in the magnetic head 8 thereby to protect data. The positional information 32 is compared with a predetermined value outputted from coefficient portion 30 in the second comparison processing portion 28. If a deviation resulted from the comparison is larger than 0.3 μm, for example, it would be assumed that the control object 25 is unusual. Since the other structure shown in FIG. 6 has been described already with respect to the embodiment described previously, the description thereof is omitted.

Since the first comparison processing portion 27 in the first embodiment can be omitted in the present embodiment, it is possible to further simplify a control system connected to the accelerometer 17 so as to realize protection of data on the magnetic disk 1.

Figure 7:
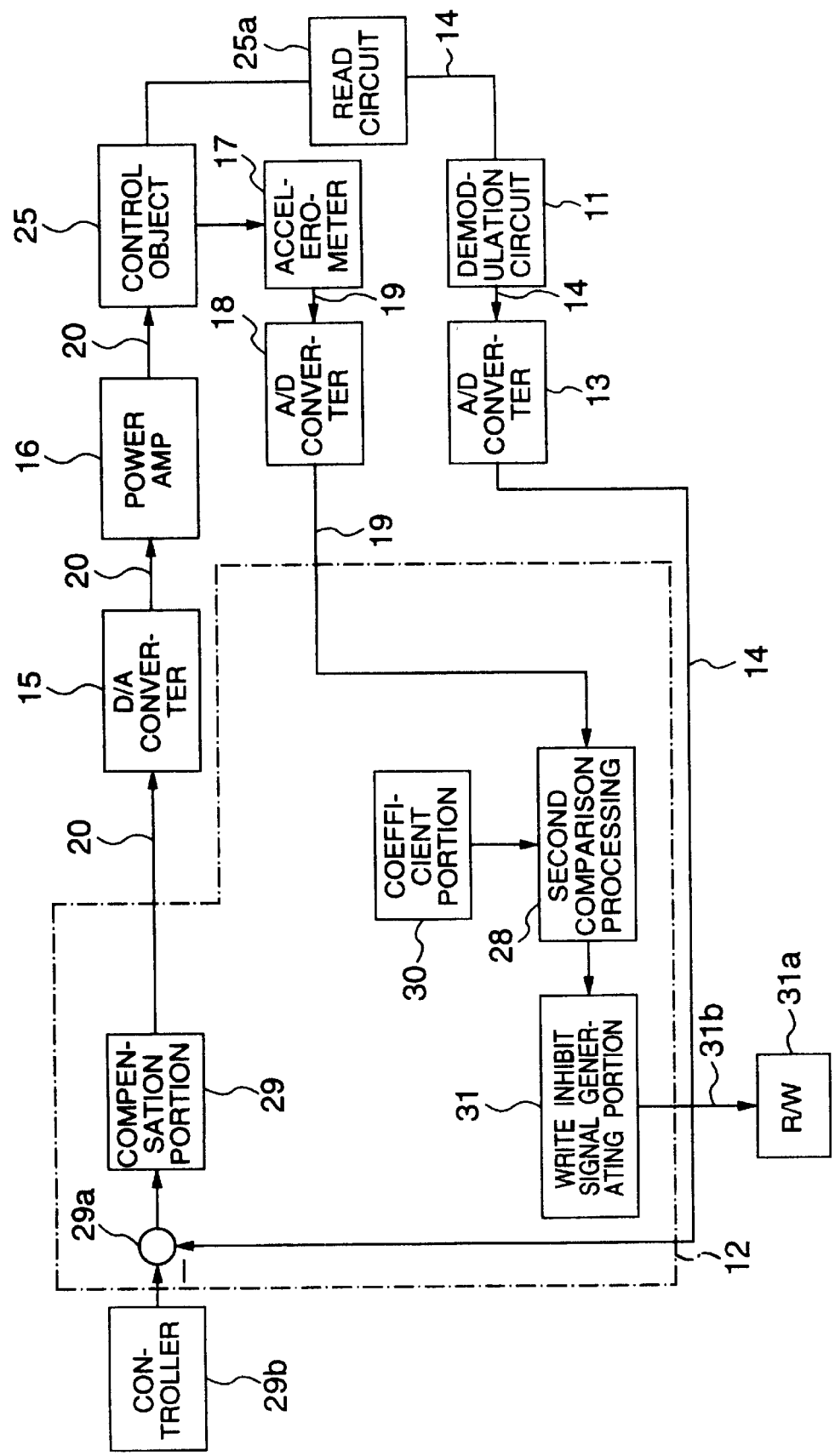
FIG. 7 is a block diagram showing another example of an apparatus for positioning a magnetic head according to the present invention.

FIG. 7 is a block diagram showing another example of an apparatus for positioning a magnetic head of the present invention. The example shown in FIG. 7 includes a second comparison processing portion 28 for comparing an acceleration signal 19 outputted from an accelerometer 17 and digitized in an AD converter 18 with a coefficient portion 30 having a predetermined value, and a write inhibit signal generating portion 31 for generating a write inhibit signal 31b in accordance with the result of comparison. What differs from the example shown in FIG. 1 is the fact that the position detection processing portion 26 and the first comparison processing portion 27 shown in FIG. 1 are not provided.

Namely, in the present example, in the following servo mode 23, when the acceleration signal 19 reaches or exceeds a value designated by the coefficient portion 30 in every sampling period of 50 μs of the acceleration signal 19, the write inhibit signal 31b is generated by the write inhibit signal generating portion 31, and the data recording operation onto the magnetic disk 1 is inhibited when the servo signal 14 is detected erroneously due to defects or the like of the servo signal 14, and an offset of the magnetic head 8 is produced, thereby to protect data.

In the case of the present example, since the existence of a servo error is determined by comparing the acceleration signal 19 digitized in the AD converter 18 as it is with a predetermined coefficient portion 30, it is possible to realize protection of data by further simplifying a control system connected to the accelerometer 17. The acceleration signal 19 is compared with a predetermined value outputted from the coefficient portion 30 in the second composition processing portion 28. If a deviation is larger than 250 m/s², it is assumed that the control object 25 is unusual.

Figure 8:
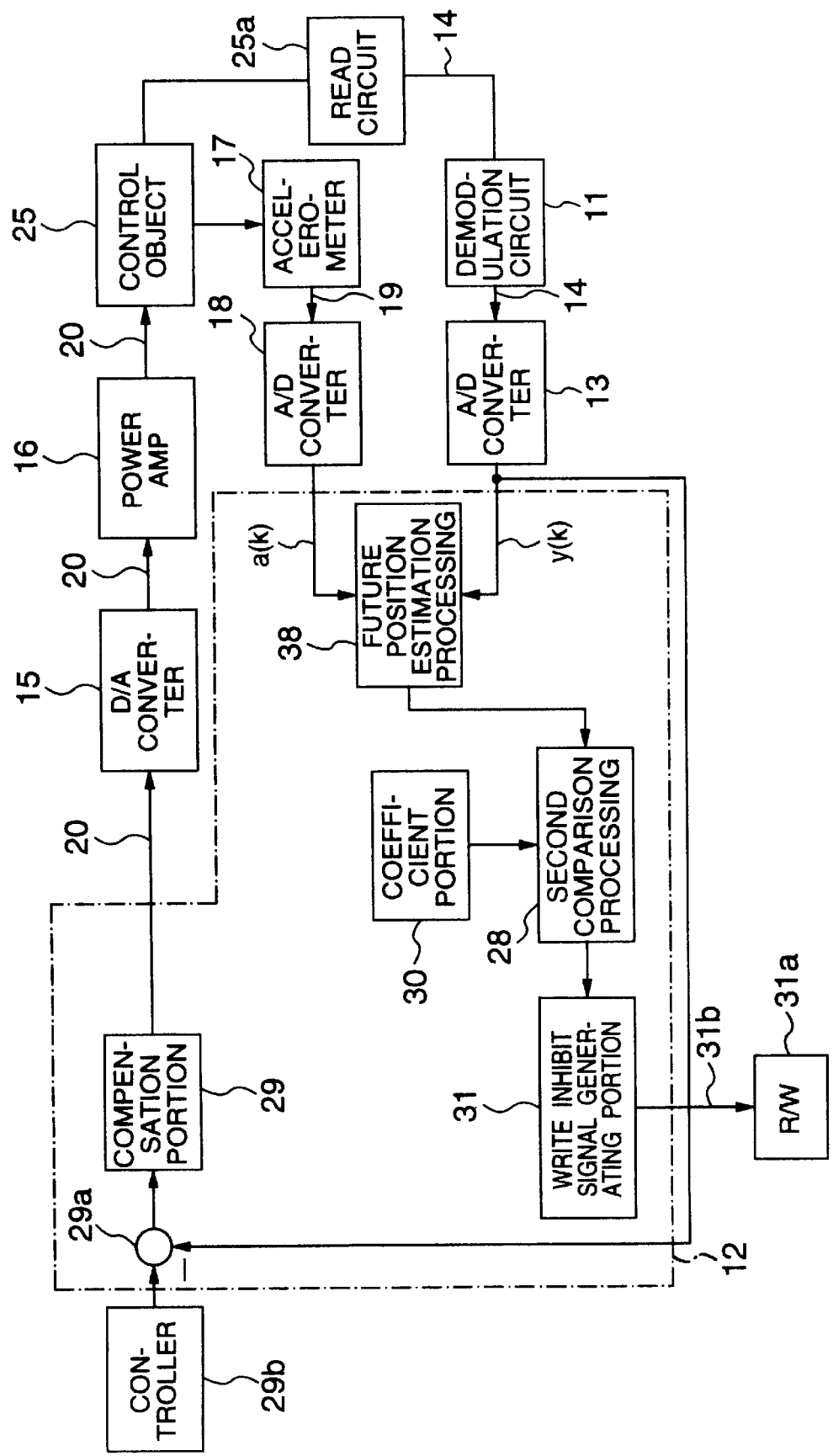
FIG. 8 is a block diagram showing another example of an apparatus for positioning a magnetic head according to the present invention.

FIG. 8 is a block diagram showing another example of an apparatus for positioning a magnetic head of the present invention. In the example shown in FIG. 8, a future position estimation processing portion 38 for estimating a future position by the following expression (1) from the acceleration signal 19 and the servo signal 14 taken in from the AD converter 13, a second comparison processing portion 28 for comparing future positional information 32a with the coefficient portion 30 having a predetermined value, and a write inhibit signal generating means 31 for generating a write inhibit signal 31b in accordance with the result of comparison are included. What differs from FIG. 1 is the fact that the future position estimation processing portion 38 is provided in place of the position computing portion 26 and the first comparison processing portion 27 is removed.

$$y\_est = y(k) + 0.5 \cdot t_s^2 \cdot a(k) \tag{1}$$

Here, y(k) is a displacement of the magnetic head 8 at the sampling time $\underline{k}$, a(k) is acceleration at the sampling time $\underline{k}$, y_est is an estimated future position, and $t_s$ is a detection sampling period of an acceleration signal.

Namely, in the present example, in the following servo mode 23, when the displacement of the magnetic head 8 obtained from an estimate based on the expression (1) in accordance with the acceleration signal 19 in every sampling period of 150 μs of the servo signal 14 reaches a predetermined value or higher, a write inhibit signal 31b is generated, and recording of data onto the magnetic disk 1 is inhibited so as to protect data when the servo signal 14 is detected erroneously by defects or the like of the servo signal 14, and an offset of the magnetic head 8 is produced.

As described above, in the present example, it is possible to detect generation of the offset or the like of the magnetic head 8 in an earlier stage based on the displacement of the magnetic head 8 estimated from the present acceleration signal 19. Therefore, it is possible to prevent recording due to erroneous servo control more surely so as to protect the data of the magnetic disk 1. Further description of structure which is also shown in FIG. 8 is omitted.

Figure 9:
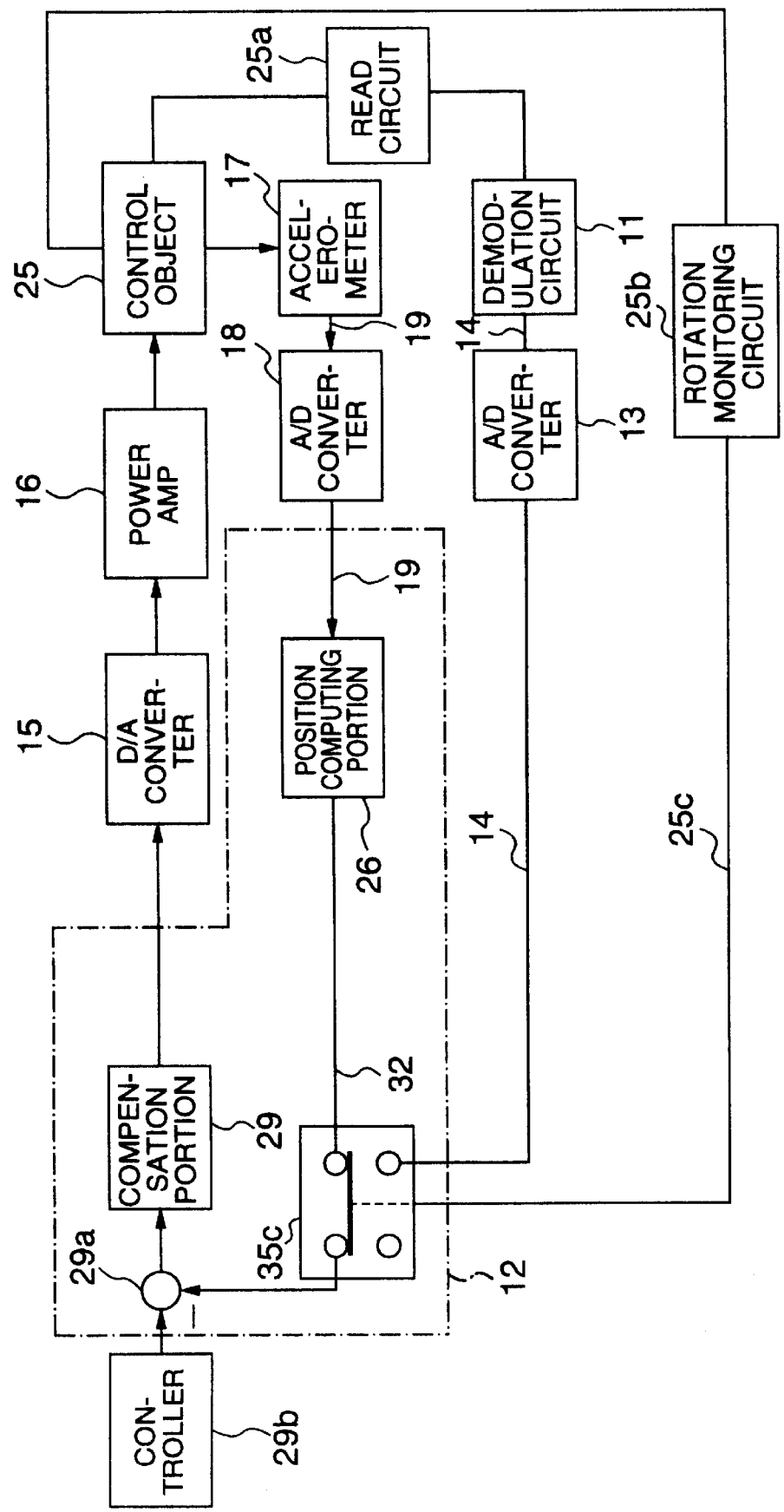
FIG. 9 is a block diagram showing another example of an apparatus for positioning a magnetic head according to the present invention.
Figure 10:
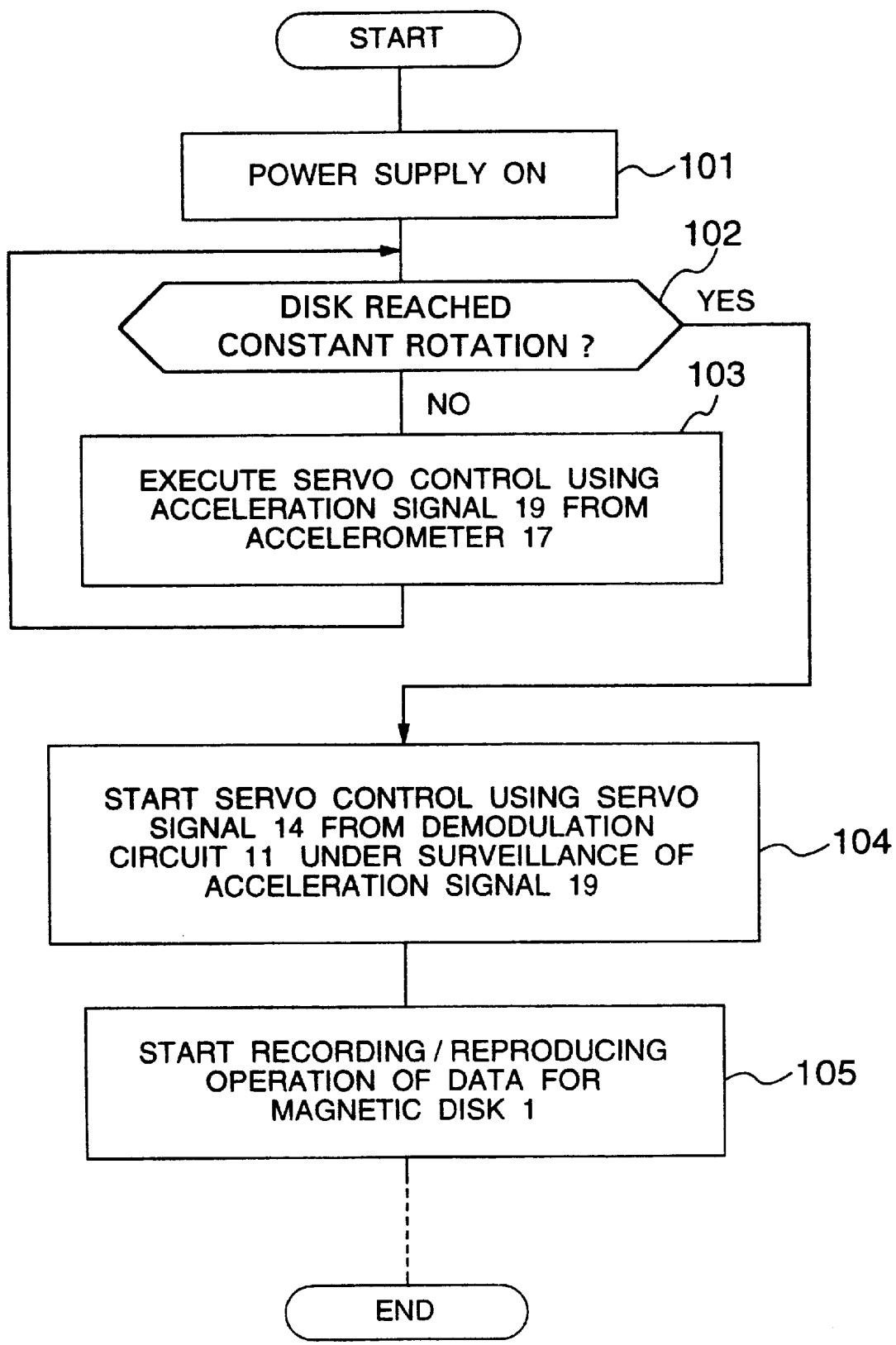
FIG. 10 is a flow chart showing the operation of an apparatus for positioning a magnetic head shown in FIG. 9.

FIG. 9 is a block diagram showing another example of an apparatus for positioning a magnetic head of the present invention, and FIG. 10 is a flow chart showing the operation thereof. FIG. 9 shows a block diagram of a servo system in the period from immediately after starting of the magnetic disk unit until the magnetic disk 1 reaches a constant rotation. In the case of FIG. 9, a rotation monitoring circuit 25b and a selective processing portion 35c are new elements. Other elements have already been explained in the drawings; therefore their explanations are omitted for the sake of simplicity. In the present example, the acceleration signal 19 is inputted to the microprocessor 12 from an AD converter 18 in a sampling period of every 50 μs. In the microprocessor 12, a position computing portion 26 for obtaining a displacement by twice integrating the acceleration signal 19 is provided, and the obtained positional information of the magnetic head 8 is fed back to an adder 29a through the selective processing portion 35c so as to be inputted to a compensation portion 29.

In the present example, since the positional information 32 of the magnetic head 8 cannot be obtained from the servo signal 14 at the time of starting of the magnetic disk unit until the magnetic disk 1 reaches a constant rotation, the positional information 32 is generated from the acceleration signal 19, which is fed back to the adder 29a during that period. Therefore, even when a large external force or offset in the magnetic head 8 is generated by an impact from the outside during that period, it is possible to prevent runaway or the like because a feedback loop is effective. Bringing the rotation of the magnetic disk 1 to a constant speed outputs a signal 25c from the disk rotation monitoring circuit 25b. The signal 25c switches the selective processing portion 35c to pass a servo signal 14 from the AD converter 13 and supply it to the adder 29a.

An example of the operation in a transient state after starting of the magnetic disk unit in the present embodiment is shown in FIG. 10. Namely, when a power supply is made (a step 101), it is determined whether the magnetic disk 1 reaches a constant speed or not (a step 102), and the actuator is controlled with a servo control loop using the acceleration signal 19 illustrated in FIG. 9 during the period when the magnetic disk 1 has not reached a certain speed (a step 103). When it is confirmed that the magnetic disk 1 has reached a constant rotation in the step 102, the signal 25c from the disk rotation monitoring circuit 25b switches the selective processing portion 35c to perform the servo control by using the servo signal 14 (a step 104), and recording/playback of data for the magnetic disk 1 is started (a step 105).

In the case of the present example, since feedback control of a positioning control system of the magnetic head 8 using the acceleration signal 19 outputted from the accelerometer 17 is also made in a transient state from immediately after starting of the magnetic disk unit in which a normal servo system referring to the servo signal 14 does not function until the magnetic disk 1 reaches a predetermined constant rotation, it is possible to surely check troubles such as runaway even when a large external force or offset of the magnetic head 8 is generated by an unexpected impact from the outside in the transient period, thus improving the reliability of the magnetic disk unit.

The present invention has been described above based on concrete embodiments, but it is a matter of course that the present invention is not limited to the above-mentioned embodiments, but may be modified in various manners within a scope which does not depart from the gist thereof.

For example, a rotating storage device is not limited to magnetic disk units illustrated in respective embodiments described above, but can be applied widely to servo control of an access device such as a head for any rotating storage medium.

Figure 11:
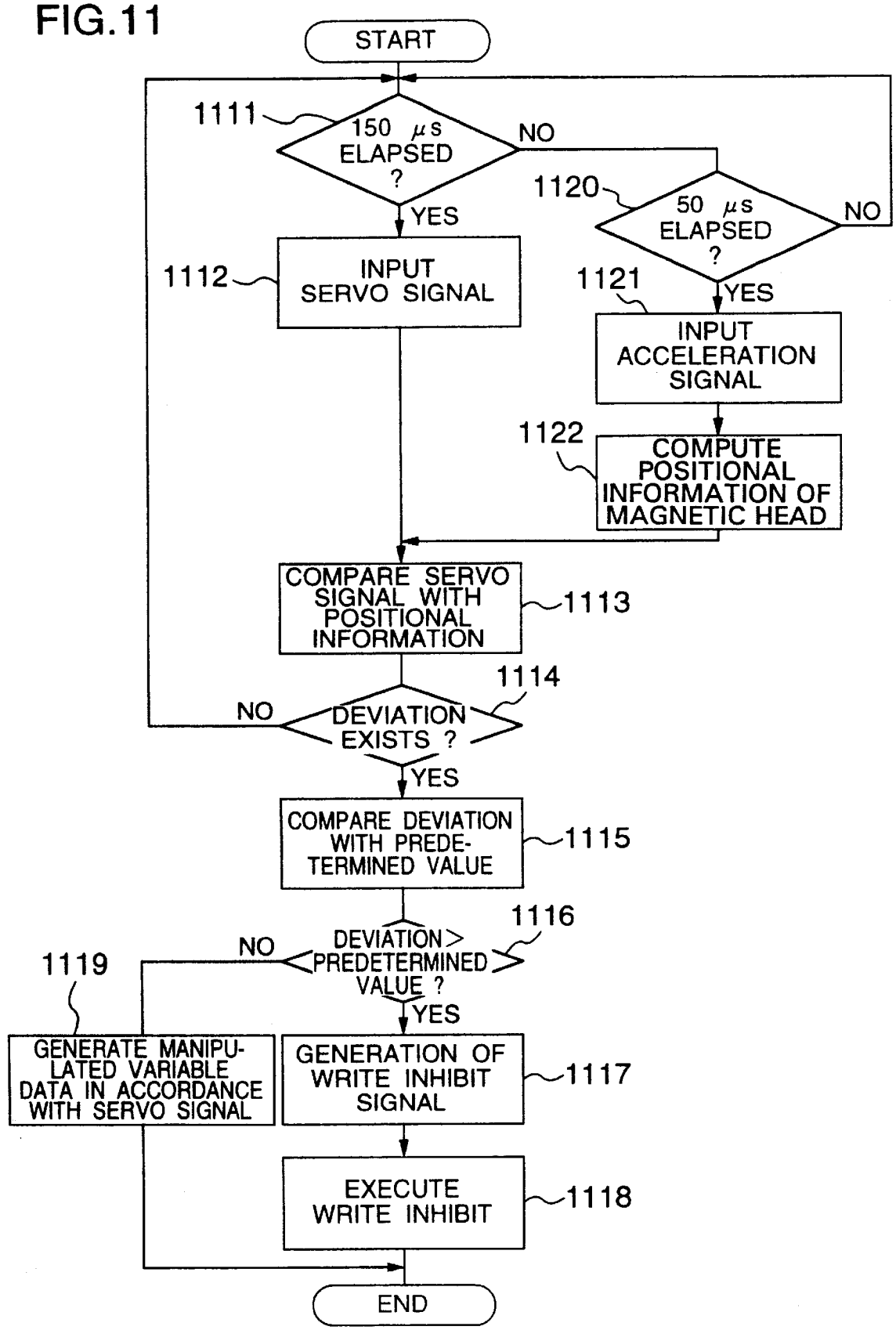
FIG. 11 is a flow chart showing the operation of an apparatus for positioning a magnetic head shown in FIG. 1.

Next, FIG. 11 is a flow chart showing the operation of the apparatus for positioning a magnetic head shown in FIG. 1. First, a step 1111 does not show a decision function of a control program, but shows that the servo signal 14 is inputted to a servo signal read circuit 25a every 150 μs in order to make it easy to understand the operation. Similarly, a step 1120 shows that the accelerometer 17 outputs the acceleration signal 19 every 50 μs. In a step 1112, the servo signal 14 is read by the servo signal read circuit 25a when 150 μs elapses from a predetermined time. The servo signal 14 is converted into a digital signal in the AD converter 13 after being demodulated by the demodulation circuit 11, and is inputted to a first comparison processing portion 27. On the other hand, in a step 1112, the acceleration signal 19 is outputted from the accelerometer 17 50 μs after the servo signal 14 is inputted. The acceleration signal 19 is integrated twice by the position computing portion 26 after being converted into a digital signal by the AD converter 18 and inputted to the first comparison processing portion 27 as the positional information 32. In a step 1113, the positional information 32 and the servo signal 14 are compared with each other. When it is found in a step 1114 that there is a deviation 33 between the positional information 32 and the servo signal 14, the deviation 33 is outputted to the second comparison processing portion 28, and, when there is no deviation, input of the servo signal 14 or the acceleration signal 19 is waited for in succession. In a step 1115, the deviation 33 is compared with a predetermined value outputted from the coefficient portion 30 in the second comparison processing portion 28. In a step 1116, when the deviation 33 is larger than the predetermined value, the write inhibit signal generating portion 31 generates the write inhibit signal 31b in a step 1117, and outputs the signal 31b to the read/write circuit 31a through a port, and write inhibit of data to the magnetic disk 1 is executed in a step 1118. When it is found in the step 1116 that the deviation 33 is not larger as compared with the predetermined value, the adder 29a receives the servo signal 14 and obtains the difference from a target value from the controller 29b, generates such manipulated variable data 20 that the difference becomes zero in the compensation portion 29, which outputs these data 20 to the DA converter 15, to adjust the position of the magnetic head 8 in accordance with these manipulated variable data 20 in a step 1119.

Figure 12:
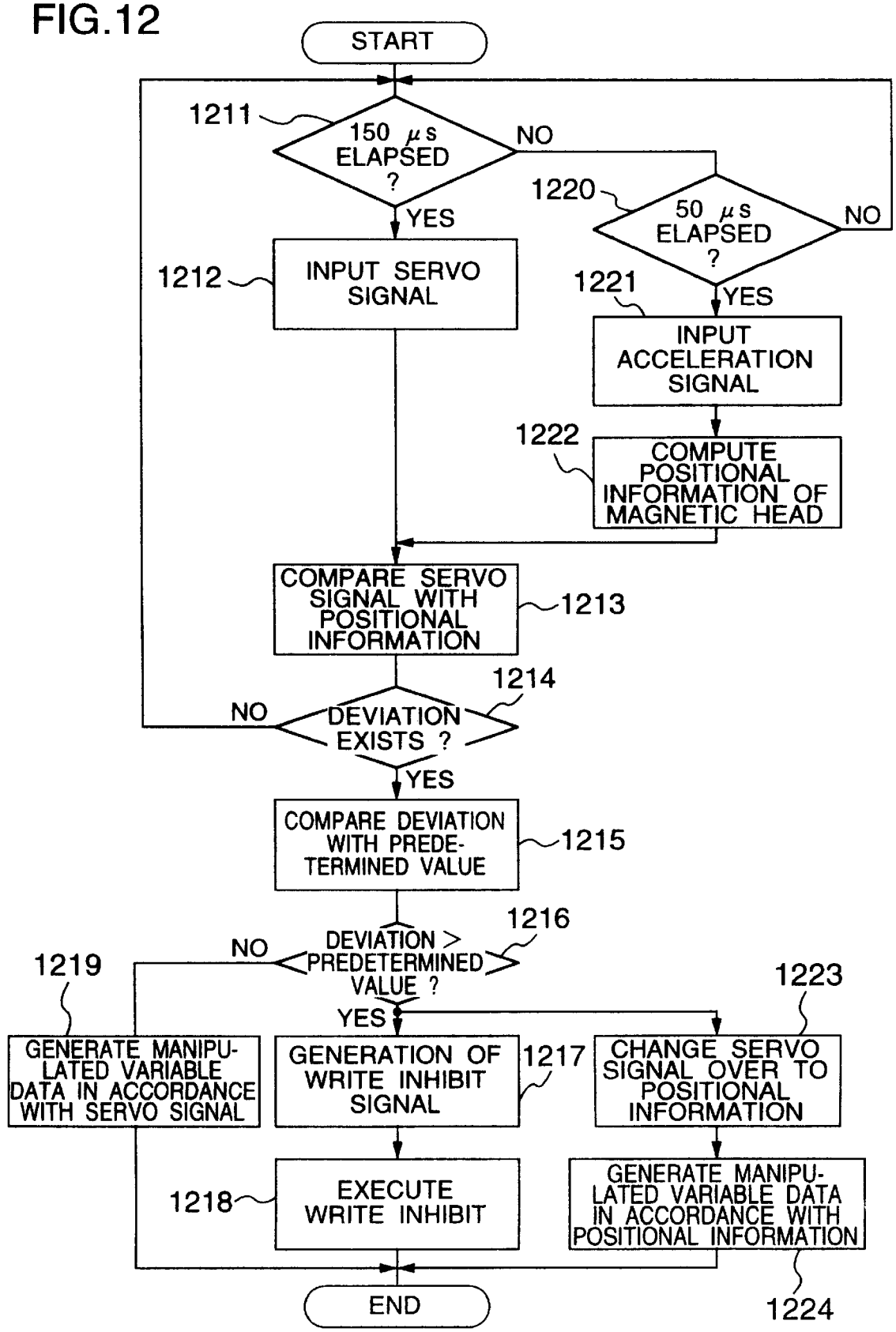
FIG. 12 is a flow chart showing the operation of an apparatus for positioning a magnetic head shown in FIG. 2.

Next, FIG. 12 is a flow chart showing the operation of the apparatus for positioning a magnetic head shown in FIG. 2. In this flow chart, since description of steps 1211 to 1215 and steps 1220 to 1222 is the same as the function described with reference to FIG. 11, the description thereof is omitted and featured portions only will be described. In a step 1216, the second comparison processing portion 28 compares the deviation 33 with a predetermined value from the coefficient portion 30, and executes the processing in the step 1119 described with reference to FIG. 11 when the deviation 33 is not larger than the predetermined value. When the deviation 33 is larger than the predetermined value, the steps 1217 to 1218 are executed in a similar manner as the processing in the steps 1117 to 1118 shown in FIG. 11, and, in a step 1223, the change-over control data 35a outputted from the second comparison processing portion 28 are outputted to the selective processing portion 35b, and the selective processing portion 35b is changed over from the input of the servo signal 14 to the input of the positional information 32 outputted from the position computing portion 26 like a change-over switch. With this, in a step 1224, the adder 29a receives the positional information 32, obtains the difference between the positional information 32 and a target value from the controller 29b, generates such manipulated variable data 20 that the difference becomes zero in the compensation portion 29, which outputs the data to the DA converter 15, to adjusts the position of the magnetic head 8 in accordance with the manipulated variable data 20. In such a way, write of data is inhibited for the magnetic disk 1. On the other hand, the manipulated variable data 20 are generated. Inhibited write of data is canceled after corrected manipulated variable data 20 are generated, and write of data is executed at the write time. Further, the above-mentioned write inhibit signal generating portion 31 generates the write inhibit signal 31b by receiving the change-over control data 35a from the second comparison processing portion 28.

Since the apparatus for positioning a magnetic head shown in FIG. 6 and FIG. 7 can be comprehended easily from the description of the flow charts shown in FIG. 11 and FIG. 12 and the description of respective structures, the description thereof is omitted.

Figure 13:
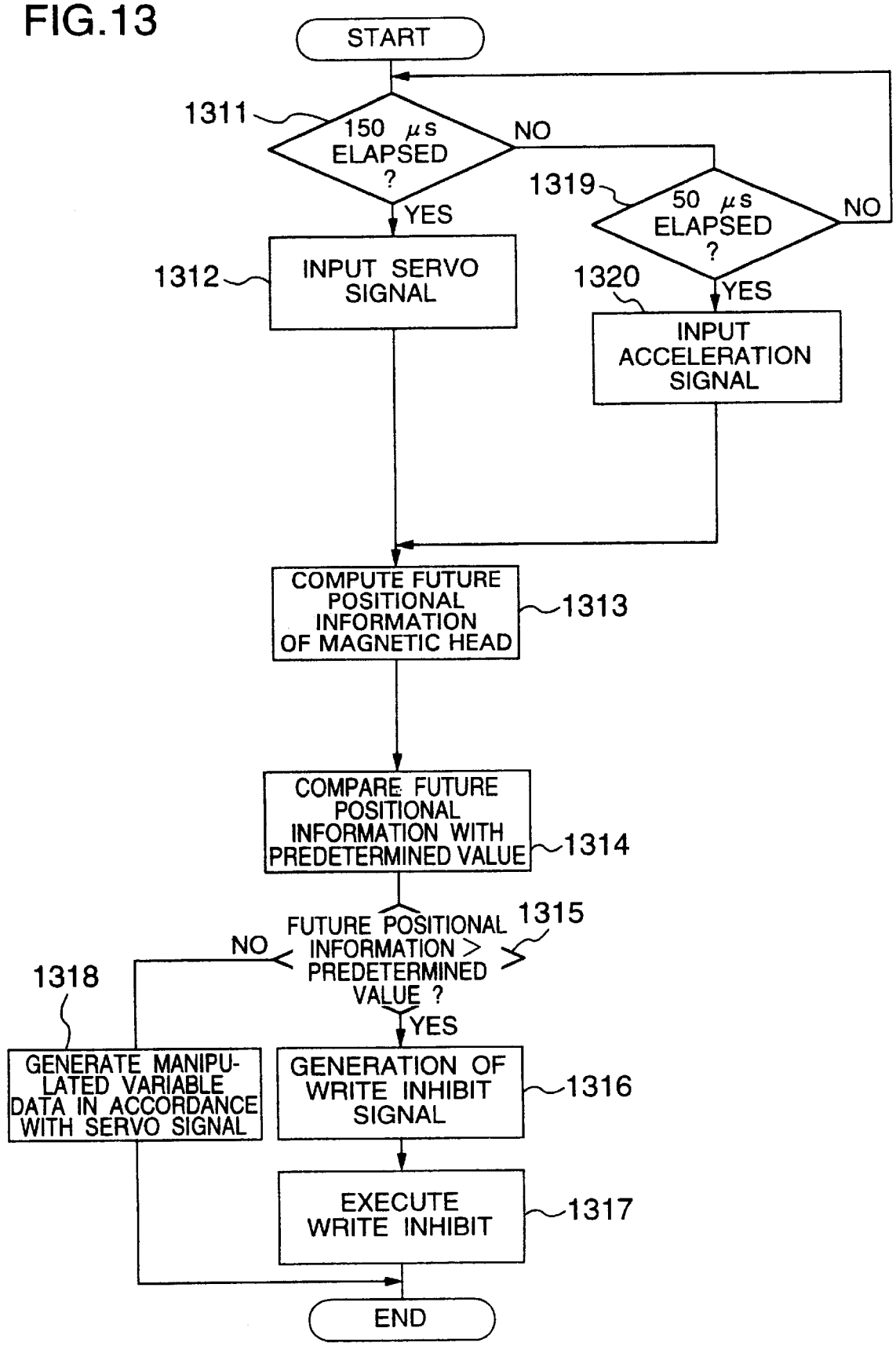
FIG. 13 is a flow chart showing the operation of an apparatus for positioning a magnetic head shown in FIG. 8.

FIG. 13 is a flow chart showing the operation of the apparatus for positioning a magnetic head shown in FIG. 8. In this flow chart, since steps 1311 to 1312 and steps 1319 to 1320 are the same as the functions described in the flow chart shown in FIG. 11, the description thereof is omitted, and only the features of this flow chart will be described. In a step 1313, both the acceleration signal 19 and the servo signal 14 are inputted to the future position estimation processing portion 38. Since a future position of the magnetic head 8 is obtained by computation, the acceleration signal 19 is expressed as a(k) and the servo signal 14 is expressed as y(k) for the sake of convenience. In the step 1313, the future positional information 32a is computed by the computation expressed by the expression (1), and is inputted to the second comparison processing portion 28. In a step 1314, the future positional information 32a and a predetermined value from the coefficient portion 30 are compared with each other by the second comparison processing portion 28. When it is found in a step 1315 that the future positional information is larger than a predetermined value, the write inhibit signal generating portion 31 generates a write inhibit signal 31b in a step 1316 and inhibits write of data onto the magnetic disk 1. In the step 1315, when the future positional information becomes larger than a predetermined value, the same processing as the step 1119 shown in FIG. 11 is performed in a step 1318.

What is claimed is:

1. An apparatus for positioning a magnetic head onto a predetermined track in order to record and reproduce data with respect to a magnetic disk, comprising:

a servo signal detection circuit for detecting a servo signal recorded on said magnetic disk in a predetermined first period;

an acceleration measuring circuit for measuring acceleration of said magnetic head in a direction of positioning said magnetic head and for outputting an acceleration signal accordingly, and for sampling the acceleration signal in a second period shorter than said first period;

comparison processing means for comparing a deviation value with a predetermined value;

write inhibit signal generating means for generating a signal of inhibiting write of data on said magnetic disk in accordance with the result of comparison by said comparison processing means; and manipulated variable compensation means for generating manipulated variable data for adjusting the position of said magnetic head from at least either one of said servo signal or said acceleration signal and a target value of the position of said magnetic head;

wherein said comparison processing means includes:

position computation processing means for outputting positional information of said magnetic head by integrating said acceleration signal twice;

first comparison processing means for comparing said positional information with said servo signal so as to generate said deviation value from said positional information and said servo signal; and second comparison processing means for comparing said deviation value with said predetermined value, and, when said deviation value is larger than said predetermined value, for outputting an instruction signal to said write inhibit signal generating means so as to generate a write inhibit signal.

2. An apparatus for positioning a magnetic head according to claim 1, wherein said acceleration measuring circuit includes an acceleration sensor affixed to said magnetic head.

3. An apparatus for positioning a magnetic head according to claim 2, wherein said acceleration measuring circuit includes an acceleration sensor affixed to a head arm supporting said magnetic head.

4. An apparatus for positioning a magnetic head according to claim 1, wherein said acceleration measuring circuit includes an acceleration sensor affixed to a rotatable carriage supporting said magnetic head.

5. An apparatus for positioning a magnetic head onto a predetermined track in order to record and reproduce data with respect to a magnetic disk, comprising:

a servo signal detection circuit for detecting a servo signal recorded on said magnetic disk in a predetermined first period;

an acceleration measuring circuit for measuring acceleration of said magnetic head in a direction of positioning said magnetic head and for outputting an acceleration signal accordingly, and for sampling the acceleration signal in a second period shorter than said first period;

comparison processing means for comparing a deviation value with a predetermined value;

write inhibit signal generating means for generating a signal of inhibiting write of data on said magnetic disk in accordance with the result of comparison by said comparison processing means; and manipulated variable compensation means for generating manipulated variable data for adjusting the position of said magnetic head from at least either one of said servo signal or said acceleration signal and a target value of the position of said magnetic head;

wherein said comparison processing means includes:

position computation processing means for outputting positional information of said magnetic head by integrating said acceleration signal twice;

first comparison processing means for comparing said positional information with said servo signal so as to generate said deviation value from said positional information and said servo signal;

second comparison processing means for comparing said deviation value with said predetermined value, and, when said deviation value is larger than said predetermined value, for outputting an instruction signal to said write inhibit signal generating means so as to generate a write inhibit signal; and selective processing means connected to said servo signal detection circuit and said position computation processing means, in which the input of said servo signal is changed over to the input of said positional information by said instruction signal, said positional information being outputted to said manipulated variable compensation means.

6. An apparatus for positioning a magnetic head onto a predetermined track in order to record and reproduce data with respect to a magnetic disk, comprising:

a servo signal detection circuit for detecting a servo signal recorded on said magnetic disk in a predetermined first period;

an acceleration measuring circuit for measuring acceleration of said magnetic head in a direction of positioning said magnetic head and for outputting an acceleration signal accordingly, and for sampling the acceleration signal in a second period shorter than said first period;

comparison processing means for comparing a deviation value computed from at least either one of said acceleration signal or said servo signal with a predetermined value;

write inhibit signal generating means for generating a signal of inhibiting write of data on said magnetic disk in accordance with the result of comparison by said comparison processing means; and manipulated variable compensation means for generating manipulated variable data for adjusting the position of said magnetic head from said at least either one of said servo signal or said acceleration signal and a target value of the position of said magnetic head;

wherein said comparison processing means includes future position estimation processing means for receiving said acceleration signal and said servo signal and outputting future positional information estimating the position of said magnetic head; and wherein said comparison processing means compares said future positional information with said predetermined value and instructs said write inhibit signal generating means to generate a write inhibit signal when said future positional information is larger than said predetermined value.

7. An apparatus for positioning a magnetic head according to claim 6, wherein said future position estimation processing means receives an acceleration signal from said acceleration measuring means and a servo signal from said servo signal detection circuit, and obtains an estimated position of said magnetic head from the following expression: y__est= y(k)+0.5·$t_s^2$·a(k), wherein y__est is an estimated future position of said magnetic head, y(k) is a displacement of said magnetic head at a sampling time k, a(k) is acceleration at a sampling time k, and $t_s$ is a detection sampling period of an acceleration signal.

8. An apparatus for positioning a magnetic head to a predetermined track in order to record and reproduce data with respect to a magnetic disk, comprising:

a servo signal detection circuit for detecting a servo signal recorded on said magnetic disk;

an acceleration measuring circuit for measuring acceleration of said magnetic head in a direction of positioning said magnetic head and for outputting an acceleration signal accordingly;

position computation processing means for outputting positional information of said magnetic head by integrating said acceleration signal twice;

first comparison processing means for comparing said positional information with said servo signal so as to generate a deviation value from said positional information and said servo signal;

second comparison processing means for comparing said deviation value with a predetermined value, and, when said deviation value is larger than said predetermined value, for outputting an instruction signal;

manipulated variable compensation means for receiving said positional information and generating manipulated variable data for adjusting the position of said magnetic head from said positional information and a target value of the position of said magnetic head; and selective processing means connected to said servo signal detection circuit and said position computation processing means, in which the input of said servo signal is changed over to the input of said positional information by said instruction signal, said positional information being outputted to said manipulated variable compensation means.

9. An apparatus for positioning a magnetic head according to claim 8, wherein said acceleration measuring circuit includes an acceleration sensor affixed to said magnetic head.

10. An apparatus for positioning a magnetic head according to claim 8, wherein said acceleration measuring circuit includes an acceleration sensor affixed to a head arm supporting said magnetic head.

11. An apparatus for positioning a magnetic head according to claim 8, wherein said acceleration measuring circuit includes an acceleration sensor affixed to a rotatable carriage supporting said magnetic head.

12. A method for positioning a magnetic head onto a predetermined track in order to record and reproduce data with respect to a magnetic disk, comprising the steps of:

(a) detecting a servo signal recorded on a magnetic disk in a predetermined first period;

(b) outputting an acceleration signal representing acceleration of said magnetic head in a direction of positioning said magnetic head, and sampling the acceleration signal in a second period shorter than said predetermined first period;

(c) comparing a deviation value with a predetermined value, and generating a write inhibit signal for inhibiting write data in said magnetic disk in accordance with the result of comparison; and (d) generating manipulated variable data for adjusting the position of said magnetic head from at least either one of said acceleration signal or said servo signal and a target value of the position of said magnetic head;

wherein, in the step (c), positional information of said magnetic head is outputted by integrating said acceleration signal twice, comparing said positional information with said servo signal so as to generate said deviation value from said positional information and said servo signal, comparing said deviation value with said predetermined value, and outputting an instruction signal for generating said write inhibit signal when said deviation value is larger than said predetermined value.

13. A method of positioning a magnetic head according to claim 12, wherein said acceleration of said magnetic head is measured using an acceleration sensor affixed to said magnetic head.

14. A method of positioning a magnetic head according to claim 12, wherein said acceleration of said magnetic head is measured using an acceleration sensor affixed to a head arm supporting said magnetic head.

15. A method of positioning a magnetic head according to claim 12, wherein said acceleration of said magnetic head is measured using an acceleration sensor affixed to a rotatable carriage supporting said magnetic head.

16. A method for positioning a magnetic head onto a predetermined track in order to record and reproduce data with respect to a magnetic disk, comprising the steps of:

(a) detecting a servo signal recorded on a magnetic disk in a predetermined first period;

(b) outputting an acceleration signal representing acceleration of said magnetic head in a direction of positioning said magnetic head, and sampling the acceleration signal in a second period shorter than said predetermined first period;

(c) comparing a deviation value with a predetermined value, and generating a write inhibit signal for inhibiting write data in said magnetic disk in accordance with the result of comparison; and (d) generating manipulated variable data for adjusting the position of said magnetic head from at least either one of said acceleration signal or said servo signal and a target value of the position of said magnetic head;

wherein, in the step (c), positional information of said magnetic head is outputted by integrating said acceleration signal twice, comparing said positional information with said servo signal so as to generate said deviation value from said positional information and said servo signal, comparing said deviation value with said predetermined value, and outputting an instruction signal for generating said write inhibit signal when said deviation value is larger than said predetermined value; and wherein the input of said servo signal is changed over to the input of said positional information by said instruction signal, and said manipulated variable data is generated together with said target value and said positional information.

17. A method for positioning a magnetic head onto a predetermined track in order to record and reproduce data with respect to a magnetic disk, comprising the steps of:

(a) detecting a servo signal recorded on a magnetic disk in a predetermined first period;

(b) outputting an acceleration signal representing acceleration of said magnetic head in a direction of positioning said magnetic head, and sampling the acceleration signal in a second period shorter than said predetermined first period;

(c) comparing a deviation value computed from at least either one of said acceleration signal and said servo signal with a predetermined value, and generating a write inhibit signal for inhibiting write data in said magnetic disk in accordance with the result of comparison; and (d) generating manipulated variable data for adjusting the position of said magnetic head from said at least either one of said acceleration signal or said servo signal and a target value of the position of said magnetic head;

wherein, in the step (c), said acceleration signal and said servo signal are received and future positional information for estimating the position of said magnetic head is outputted, and wherein said future positional information is compared with said predetermined value and said write inhibit signal is generated when said future positional information is larger than said predetermined value.

18. A method for positioning a magnetic head onto a predetermined track in order to record and reproduce data with respect to a magnetic disk, comprising the steps of:

(a) detecting a servo signal recorded on a magnetic disk in a predetermined first period;

(b) outputting an acceleration signal representing acceleration of said magnetic head in a direction of positioning said magnetic head, and sampling the acceleration signal in a second period shorter than said predetermined first period;

(c) comparing a deviation value computed from at least either one of said acceleration signal and said servo signal with a predetermined value, and generating a write inhibit signal for inhibiting write data in said magnetic disk in accordance with the result of comparison; and (d) generating manipulated variable data for adjusting the position of said magnetic head from said at least either one of said acceleration signal or said servo signal and a target value of the position of said magnetic head;

wherein, in said step (c), said acceleration signal and said servo signal are received, and an estimated position of said magnetic head is obtained from the following expression:

$y\_est = y(k) + 0.5 \cdot t_s^2 \cdot a(k)$, wherein $y\_est$ is an estimated future position of said magnetic head, $y(k)$ is a displacement of said magnetic head at a sampling time k, $a(k)$ is acceleration at a sampling time k, and $t_s$ is a detection sampling period of an acceleration signal.

19. A method of positioning a magnetic head onto a predetermined track in order to record and reproduce data with respect to a magnetic disk, comprising the steps of:

(a) detecting a servo signal recorded on said magnetic disk;

(b) outputting an acceleration signal representing acceleration of said magnetic head in a direction of positioning said magnetic head;

(c) outputting positional information of said magnetic head by integrating said acceleration signal twice, comparing said positional information with said servo signal so as to generate a deviation value from said positional information and said servo signal, comparing said deviation value with a predetermined value, and outputting an instruction signal when said deviation value is larger than said predetermined value; and (d) receiving said positional information and generating manipulated variable data for adjusting the position of said magnetic head from said positional information and a target value of the position of said magnetic head;

wherein the input of said servo signal is changed over to the input of said positional information by said instruction signal, and said manipulated variable data is generated together with said target value and said positional information.

* * * * *